United States Patent [19]
Bram

[11] 3,884,510
[45] May 20, 1975

[54] DEVICE FOR THE TENSILE LOCKING OF PIPE ELEMENTS

[75] Inventor: Georges Eugène Bram, Pont-a-Mousson, France

[73] Assignee: Pont-a-Mousson S. A., Nancy, France

[22] Filed: July 22, 1974

[21] Appl. No.: 490,601

Related U.S. Application Data
[63] Continuation of Ser. No. 298,749, Oct. 18, 1972, abandoned.

[30] Foreign Application Priority Data
Nov. 4, 1971 France .................. 71.39488

[52] U.S. Cl. ............ 285/39; 285/284; 285/321; 285/374
[51] Int. Cl. ............................ F16l 13/10
[58] Field of Search .......... 285/284, 321, 288, 295, 285/296, 54, 53, 52, 51, 50, 297, 294, 374, 337, 39, DIG. 16

[56] References Cited
UNITED STATES PATENTS

| | | |
|---|---|---|
| 1,982,044 | 11/1934 | Clark ............................. 285/296 |
| 2,398,399 | 4/1946 | Alexander ...................... 285/288 X |
| 3,177,019 | 4/1965 | Osweiler ......................... 285/288 |
| 3,441,293 | 4/1969 | Bagnulo .......................... 285/50 |
| 3,503,633 | 3/1970 | Braun et al. .................... 285/54 |
| 3,684,320 | 8/1972 | Platzer et al. .................. 285/374 X |

Primary Examiner—Thomas F. Callaghan
Attorney, Agent, or Firm—Sughrue, Rothwell, Mion, Zinn & Macpeak

[57] ABSTRACT

Device for axially locking a joint between two pipe elements whose axes may have an angular deviation. An abutment projection on one of the pipe elements is surrounded by a hollow member of revolution which is integral with the other of the pipe elements and has an inner shoulder and surrounds the joint. A ring is located axially between the shoulder and the abutment projection against which the ring axially bears. A mass of hardenable material is disposed in the whole of the space which remains free in the hollow member around the abutment projection and ring.

3 Claims, 9 Drawing Figures

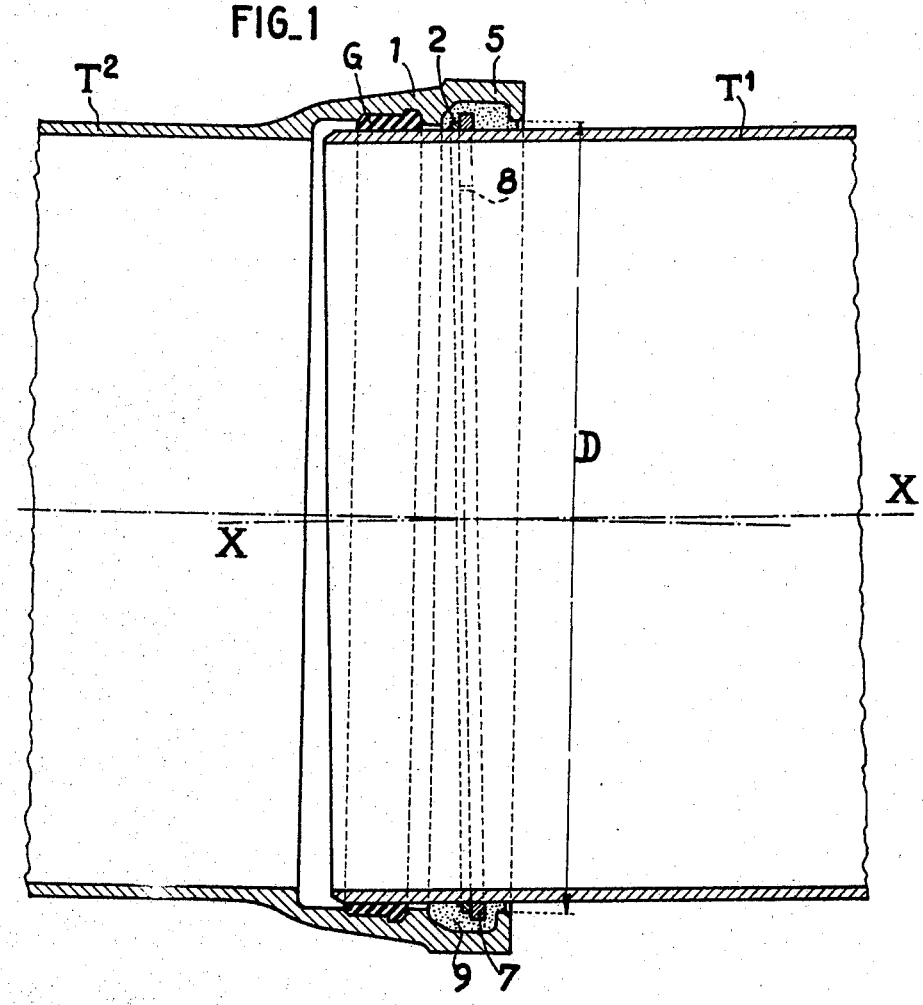
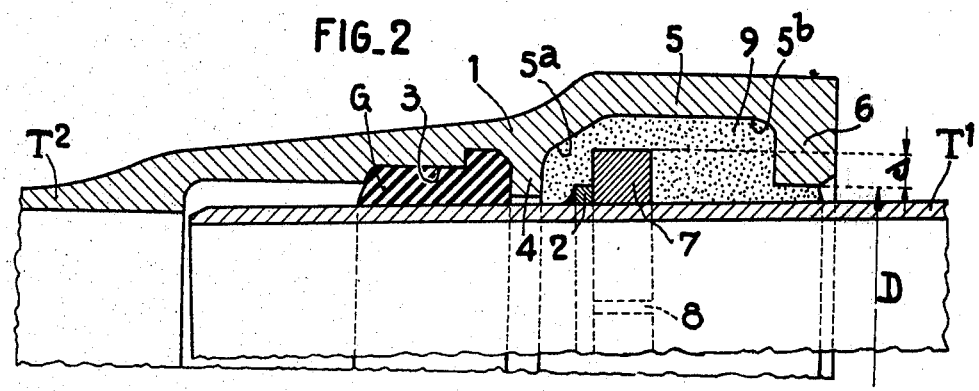

3,884,510

DEVICE FOR THE TENSILE LOCKING OF PIPE ELEMENTS

This is a Continuation, of application Ser. No. 298,749, filed Oct. 18, 1972 and now abandoned.

The present invention relates to a device for the tensile locking of the joint or coupling of two pipe elements and in particular elements of large diameter.

In a pipe under pressure, the forces resulting from the thrust of the fluid conveyed in the pipe may be extremely high. They are in the neighbourhood of 900 metric tons in the case of a 1,600 mm pipe subjected to an internal pressure of 40 bars. The thrusts are produced at each end of the pipe, at each change of direction or diameter, and at each branch connection.

Now, the function of the joint or coupling usually employed is to ensure the sealing between the various elements of the pipe but not to oppose the thrusts due to the pressure of the fluid. This is why there are provided whenever possible supports at the aforementioned points of the pipe which are afforded by masses of concrete which are so calculated and designed that they resist these thrusts by their weight or by the bearing of the masses of concrete against the walls of the trench or excavation if the ground is sufficiently strong.

However, the construction of such a mass is sometimes impossible or too expensive. It is then necessary to replace the masses of concrete by so-called locked joints in which parts which are integral or rendered integral with the two pipe elements to be joined preclude the disconnection of these elements.

The choice of members of revolution for this interconnection avoids, when the thrust is high, the provision of excessively massive parts at only a few points of the periphery of the pipe.

However, these members of revolution must exert an effective support throughout the periphery of the pipe. Now, this condition is not satisfied when there is an angular deviation between two successive pipe elements.

An object of the present invention is to provide a locking device which employs a member of revolution but in which this member is capable of affording an effective support throughout the periphery of the pipe in the case of an angular deviation between the pipe elements.

The invention provides a device which is for the tensile locking of the joint between two pipe elements which may have an angular deviation therebetween and is of the type in which an abutment projection integral with the outer surface of the end portion of a first of the pipe elements is supported by a shoulder defined by the inner face of a hollow member of revolution which surrounds the region of the joint and abutment projection and is itself integral with the outer surface of the end portion of the second pipe element, said device comprising a ring which bears against a face of the abutment projection which is adjacent said shoulder and a mass of hardenable material disposed in the whole of the space which remains free in said member of revolution around the abutment projection and the ring.

Further features and advantages of the invention will be apparent from the ensuing description with reference to the accompanying drawings.

In the drawings:

FIG. 1 is a longitudinal diametral sectional view of a joint or coupling of two pipe elements which have respectively a male end and a socket and are interlocked by means of the device according to the invention, the two elements having an angular deviation;

FIG. 2 is a view which is similar to FIG. 1 but partial and to an enlarged scale;

Figure 3:
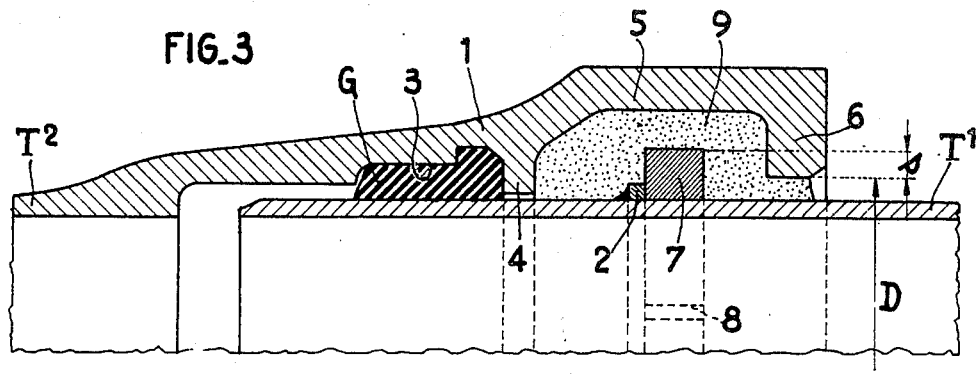
FIG. 3 is a view similar to FIG. 2 in which the pipe elements are in coaxial alignment.

The illustrated joint or coupling is achieved between two tubular pipe elements $T^1$ and $T^2$ of spheroidal graphite cast iron, the first element $T^1$ having a male end inserted in the socket 1 of the second element $T^2$.

The male end of element $T^1$ carries an annular abutment projection 2 having a square cross section, the side dimension of which is of the order of the thickness of the wall of the pipe elements. This projection is of steel or spheroidal graphite cast iron and is mounted on and welded to the element $T^1$ in the factory in a plane perpendicular to the axis $X-X$ of the element $T^1$. The socket 1 of the element $T^2$ has two socket portions having internally two chambers of revolution defining recesses, namely:

A first recess 3, or sealing recess, which has an internal profile of known type and is defined by an annular inner flange 4 adjacent its end portion of conventional type and it contains a radially compressed elastomer sealing element G.

A second recess 5, or locking recess, which is cast in one piece with the element $T^2$, extends the latter beyond the flange 4 and is defined at its end remote from the flange 4 by another inner annular flange 6. Between these two flanges its wall of revolution has a frustoconical part 5a connected to the flange 4 and a cylindrical part 5b connected to the flange 6. The axial and radial inside dimensions of this recess are distinctly greater than those of the sealing recess 3. Its entrance diameter, constituted by the inside diameter D of the flange 6, is sufficient to allow all allowable angular deviations between the two pipe elements within the variation range compatible with the correct sealing, as shown in particular in FIGS. 1 and 2.

The abutment projection 2 is disposed in the vicinity of the end of the element $T^1$ but at sufficient distance from this end that it does not come in contact with the flange 4 of the element $T^2$ when the joint is in its final position after the sealing element G has been inserted.

The two pipe elements are locked together by means of a ring 7 of square-section steel the side dimension of which is small with respect to the diameter but is distinctly greater than that of the abutment projection and is substantially equal to the radial dimension of the flange 6 of the locking recess 5b. The outside diameter of the ring 7 must exceed the entrance diameter D of the recess 5 for reasons which will be understood hereinafter. The ring 7 is relatively resilient and split at 8 in a direction parallel to its axis of revolution. Its section may be other than a square section provided that its inner surface is cylindrical.

The FIGS. 2 and 3 show the two pipe elements $T^1$ and $T^2$ coupled or joined after the locking device has been place in position.

The space available in the locking recess 5, that is to say, the space which is not occupied by the split ring 7 and abutment projection 2 integral with the element $T^1$, is filled with a hardened packing material 9. This material, which is plastic or liquid when applied, is chosen for its ability to harden and reach some compressive and shear strengths and resistance to deformability as to withstand any force which would separate the male end from the socket. In a preferred embodiment, this material is a mixture of sand and epoxy resin in suitable proportions and qualities to obtain, at surrounding temperature and within an acceptable period of time, compressive and shear strength, modulus of elasticity, coefficient of thermal expansion and coefficient of water absorption which are such that the axial thrust is withstood throughout the life of the piping to which the pipe elements belong without this material being affected. The proportions by weight are, for example, one part of epoxy resin for two parts of sand.

The facing surfaces of the ring 7 and end flange 6 of the locking recess 5 must afford a sufficient support to the packing material 9 after its hardening. For this purpose, assuming that:

C : the compressive strength of the packing material 9;

$s$ : the cross section common to the facing surfaces of the flange 6 of the recess and the ring 7;

S : the section corresponding to the outside diameter of the male end of the pipe element $T^1$ ($=\pi D^2/4$) and, P : the trial pressure, the relation $C.s \geq P.S$ must be satisfied. It is therefore obvious that the outside diameter of the ring 7 must exceed the diameter D of the socket entrance as far as this condition requires.

Figure 4:
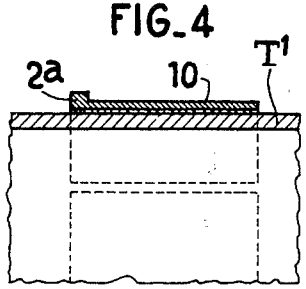
FIGS. 4, 5 and 6 are partial diametral longitudinal sectional views of three modifications of the device according to the invention concerning the abutment projection of the male end.
Figure 5:
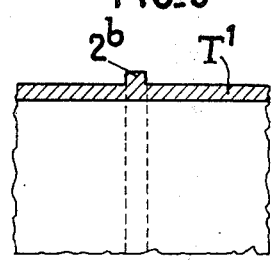
Figure 6:
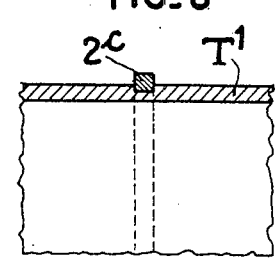

By way of a modification, the abutment projection may have the section shown in FIG. 4 in which a part 2a of square section is integral with the end of a sleeve 10 of rectangular section whose thickness is small with respect to the side of the square-section abutment projection and whose length, measured along the axis of the element $T^1$, is several times that of said side of the square section. This abutment projection is also split so as to facilitate the assembly and placed in position in the factory and secured by adhesion. In two other modifications, there is provided an abutment projection 2b machined or cast in one piece with the male end of the pipe element $T^1$ when the latter is produced (FIG. 5) or an abutment projection 2c which is similar to the projection 2 but anchored in a groove formed in the outer face of the wall of the pipe element $T^1$ to a depth of half the wall thickness (FIG. 6).

It may also have any section provided that the inner side of this section is parallel to the axis of the element $T^1$ and that another side remote from the free end of the element $T^1$ is perpendicular to this axis.

The joint or coupling described hereinbefore is locked in the following manner:

In the free state of the ring 7, its two ends defined by the split 8 are in contact with each other.

Figure 7:
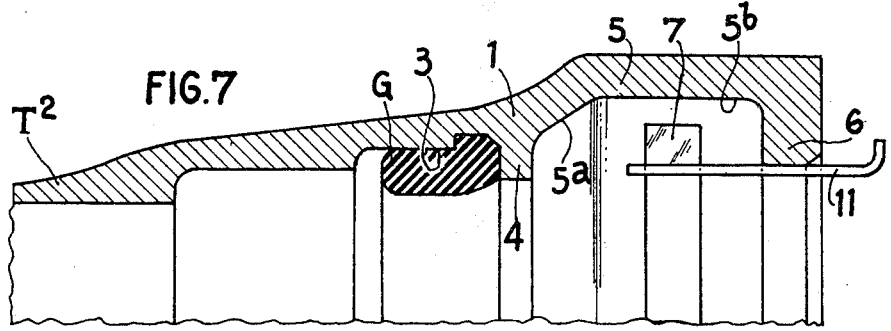
FIG. 7 is a view similar to FIGS. 2 and 3 showing only the pipe element having the socket and the ring ready for mounting.
Figure 8:
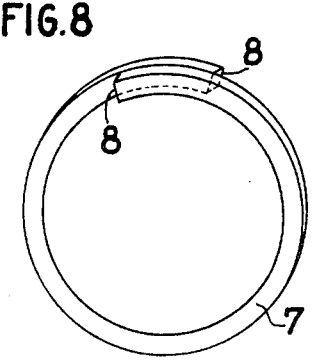
FIGS. 8 and 9 are perspective views of the ring respectively in two successive positions in the course of its mounting but with proportions of exaggerated sizes so as to render the operation of mounting the ring more clear.
Figure 9:
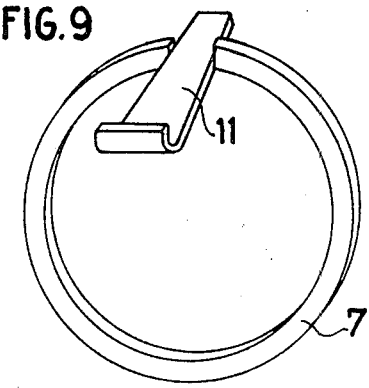

Before the pipe elements are interengaged the ring 7 is first introduced in the socket by contracting it as shown in FIG. 8 so that the two neighbouring portions defining its split overlap a given extent in assuming axially juxtaposed positions and then the ring is urged flat against the wall 5b of the locking recess by inserting in the split 8 a wedge 11 which maintains the ring expanded as shown in FIGS. 7 and 9. In this position it can pass over the abutment projection 2 when the male end of the element $T^1$ is inserted in the socket of element $T^2$. It will be clear that to permit this, the inside diameter of the cylindrical wall 5b of the recess 5 must exceed the outside diameter of the abutment projection 2 to an extent at least twice the radial thickness of the ring 7.

When the pipe elements are joined together, first the conventional operations for assembling the joint are carried out and followed possibly by an orientation. The male end of the pipe element $T^1$ is then inserted with its projection 2 in the double recess of the socket of the element $T^2$ which contains the sealing element G and the locking ring 7 (FIG. 7).

The locking operation proper comprises, in a first stage, removing the wedge 11 which maintained the ring 7 in the expanded condition and bringing this ring against the projection 2 in its final position on the side of the projection 2 remote from the free end of the pipe element $T^1$. The plastic or liquid packing material 9 is then injected into the whole of the space remaining free in the locking recess 5 around the projection 2 and the ring 7.

FIGS. 1 and 2, on one hand, and FIG. 3, on the other, show the assembled and locked joint respectively in a deviated position and aligned position of the pipe elements $T^1$ and $T^2$.

This type of locking affords the advantage of allowing with certainty a full sealing of all of the space available inside the locking recess 5. The locking device guarantees an absolutely perfect distribution of the thrust throughout the periphery and requires very low coefficients of safety as concerns dimensions of the tensile locking means, that is to say, the additional part integral with the sealing recess 3 and constituting the locking recess 5, since there is no danger of concentration of the axial thrust at only one point of the periphery of the pipe even when there is an angular deviation between the pipe elements.

Having now described my invention what I claim as new and desire to secure by Letters Patent is:

1. A device for axially locking a joint between two pipe elements whose axes may have an angular deviation so as to preclude axial separation of the pipe elements, the device comprising an annular abutment projection integral with an outer surface of an end portion of a first of said pipe elements and spaced from one end thereof, a hollow member of revolution integral with an end portion of a second of said pipe elements and having an inwardly intending annular first shoulder, an inner annular recess and an annular second shoulder, which defines an axially outer end of the inner recess and also defines an entrance to said recess, a ring located axially between the second shoulder and the abutment projection and bearing axially against the abutment projection and defining an annular axial space with the second shoulder said ring having an outer diameter greater than the outer diameter of said abutment projection and the inner diameter of said second shoulder, said inner recess being in radially spaced relation to said outer surface and to the ring and said entrance having a diameter less than the outer diameter of said ring, said inner recess having an axial extent and an inside diameter which are such as to allow up to a given angular deviation between the axes of the two pipe elements without contact of said ring with said inner recess and second shoulder, said ring and said abutment projection being axially spaced from said first and second shoulders, said ring being of a resilient material and has a split which is parallel to the axis of the ring and extends throughout the axial length of the ring for receiving a tool for expanding the ring, the inside diameter of said recess being such as to allow sufficient expansion of the ring disposed inside said recess to permit the ring to pass over the abutment projection when inserting the first pipe element in the hollow member of revolution, and a hardened mass of initially moldable filler material disposed in the whole of said annular space and interposed between said inner recess and the ring and said outer surface. said inner recess, outer surface, first and second shoulders, abutment projection, and ring being in intimate contact with said filler material in the manner of a mold for said filler material, said material having such strength and such resistance to deformation as to be capable of withstanding force normally to be expected to be exerted on said material by said ring and second shoulder in pipe service.

2. A device as claimed in claim 1, wherein the first pipe element has a male end, the hollow member of revolution constitutes a first socket and the second pipe element has a second socket with a sealing element interposed radially between the male end and the second socket in a radially compressed condition, the socket which constitutes the hollow member of revolution being disposed axially beyond and integral with the second socket and defining the end of the second pipe element.

3. A device as claimed in claim 1 wherein said end portion of said first of said pipe elements maintains an axial and radial clearance with respect to the inner annular recess in said end portion of said second pipe element.

* * * * *